US010310825B2

(12) United States Patent
Segan et al.

(10) Patent No.: US 10,310,825 B2
(45) Date of Patent: Jun. 4, 2019

(54) PROVIDING PLATFORM-AGNOSTIC PRIMITIVES FOR MARKUP CODE TO CLIENT DEVICES

(71) Applicant: FACEBOOK, INC., Menlo Park, CA (US)

(72) Inventors: Maxwell Meyer Segan, New York, NY (US); Henry Zheng Zhang, Edison, NJ (US); Rohan Mehta, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 90 days.

(21) Appl. No.: 15/611,686

(22) Filed: Jun. 1, 2017

(65) Prior Publication Data

US 2018/0349120 A1    Dec. 6, 2018

(51) Int. Cl.
*G06F 8/38* (2018.01)
*G06F 9/455* (2018.01)
*H04L 29/08* (2006.01)

(52) U.S. Cl.
CPC ............ *G06F 8/38* (2013.01); *G06F 9/45508* (2013.01); *H04L 67/02* (2013.01); *H04L 67/2823* (2013.01)

(58) Field of Classification Search
CPC ..... G06F 8/51; G06F 8/38; G06F 8/76; H04L 67/42
USPC .......................................................... 717/137
See application file for complete search history.

(56) References Cited

U.S. PATENT DOCUMENTS

| 7,296,263 | B1 * | 11/2007 | Jacob .................. G06F 17/2247 709/246 |
| 8,595,186 | B1 * | 11/2013 | Mandyam ................. G06F 8/38 707/632 |
| 9,135,631 | B2 * | 9/2015 | Mitchell ................ G06Q 30/02 |
| 9,301,016 | B2 * | 3/2016 | Archibong ............ G06Q 50/01 |
| 9,672,496 | B2 * | 6/2017 | Mitchell ............. G06Q 10/107 |
| 2003/0226111 | A1 * | 12/2003 | Wirts ........................ G06F 8/38 715/209 |
| 2004/0216044 | A1 * | 10/2004 | Martin ...................... G06F 8/10 715/273 |
| 2008/0098300 | A1 * | 4/2008 | Corrales ........... G06F 17/30864 715/243 |
| 2008/0244613 | A1 * | 10/2008 | Parthasarathy ......... G06F 9/546 719/313 |
| 2011/0289140 | A1 * | 11/2011 | Pletter ............... G06F 17/30575 709/203 |
| 2012/0010995 | A1 * | 1/2012 | Skirpa ................... G06F 3/0481 705/14.49 |
| 2012/0297365 | A1 * | 11/2012 | Altin ..................... G06F 9/4493 717/124 |
| 2013/0044959 | A1 * | 2/2013 | Mitchell ............... G06Q 30/02 382/217 |

(Continued)

*Primary Examiner* — Duy Khuong T Nguyen
*Assistant Examiner* — Theodore E Hebert
(74) *Attorney, Agent, or Firm* — Morgan, Lewis & Bockius LLP (57) ABSTRACT

A server system obtains markup code for a native application for client devices. The markup code is agnostic regarding types of client devices. The server system translates the markup code into a set of primitives. Client devices of multiple types running a native application send a request for content for the native application to the server system. The server system provides the set of primitives to the client devices of multiple types, and the client devices render the set of primitives in the native application.

20 Claims, 11 Drawing Sheets

(56) References Cited

U.S. PATENT DOCUMENTS

| | | | |
|---|---|---|---|
| 2013/0254850 A1* | 9/2013 | Alison | H04W 4/21 |
| | | | 726/4 |
| 2017/0054793 A1* | 2/2017 | Urbach | G09G 5/14 |
| 2017/0357490 A1* | 12/2017 | Park | G06F 8/38 |
| 2018/0107343 A1* | 4/2018 | Mills | H04L 67/10 |

* cited by examiner

Markup Code 602

```
Tap-action={
  <nt:fb:action:async
    query=[
      ExampleNTAsyncController::getQueryBuilder()
        ->setString('root_id', $root_id)
        ->getQuery()
    ]
  />
}
```

Action Code 604

```
Class ExampleNTAsyncController
  extends NTAsyncController { public async function genResponse(
  ): Awaitable<:nt:action>{
    $root_id = $this->getRequest()->getString('root_id');
    return <nt:action:replace target-id={$root_id}>...</>;
  }
}
```

FIGURE 6

PROVIDING PLATFORM-AGNOSTIC PRIMITIVES FOR MARKUP CODE TO CLIENT DEVICES

TECHNICAL FIELD

This relates generally to providing primitives translated by a server from markup code to client devices, including but not limited to providing platform-agnostic primitives to multiple types of client devices.

BACKGROUND

Native applications on a user device are specifically designed to run on a user device's operating system (e.g., iOS, Android, Windows OS, etc.). Native applications perform quickly on the device by working with the user device's built-in features such as GPS, camera, etc. However, native applications must be recreated on separate platforms such as the aforementioned iOS, Android, Windows OS, etc., which may be costly and labor intensive.

SUMMARY

Accordingly, there is a need for a method in which a server may anticipate a client device's needs and prepare itself for requests that the client device may send, in a platform-agnostic (i.e., client-device-type agnostic) manner. Server systems having platform-agnostic markup code that is translated into platform-agnostic primitives can provide the primitives to the client device to be rendered at the client device with minimal delay.

In accordance with some embodiments, a method is performed at a server system with one or more processors and memory storing instructions for execution by the one or more processors. The method includes obtaining markup code for a native application for client devices. The markup code is agnostic regarding types of client devices. The method further includes translating the markup code into a set of primitives. The set of primitives is agnostic regarding types of client devices. The method also includes providing the set of primitives to a first group of client devices of a first type for rendering, in response to respective requests from the client devices of the first group when running the native application. Additionally, the method includes providing the set of primitives to a second group of client devices of a second type for rendering, in response to respective requests from the client devices of the second group when running the native application.

In accordance with some embodiments, a server system associated with an email monitoring service includes one or more processors and memory storing one or more programs for execution by the processor. The one or more programs include instructions for performing the operations of the server-side method described above. In accordance with some embodiments, a non-transitory computer-readable storage medium stores instructions that, when executed by a server system, cause the server system to perform the operations of the server-side method described above.

In accordance with some embodiments, a method is performed at a client device having one or more processors and memory storing instructions for execution by the one or more processors. The method includes running a native application, sending a request for content from the native application to a server system associated with the native application, and receiving, from the server system in response to the request, a set of primitives corresponding to markup code for the native application. The set of primitives is agnostic regarding types of client devices. The method further includes rendering the set of primitives in the native application.

In accordance with some embodiments, a client device includes one or more processors and memory storing one or more programs for execution by the processor. The one or more programs include instructions for performing the operations of the client-side method described above. In accordance with some embodiments, a non-transitory computer-readable storage medium stores instructions that, when executed by a client device, cause the client device to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first group could be termed a second group, and, similarly, a second group could be termed a first group, without departing from the scope of the various described embodiments. The first group and the second group are both groups, but they are not the same group.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
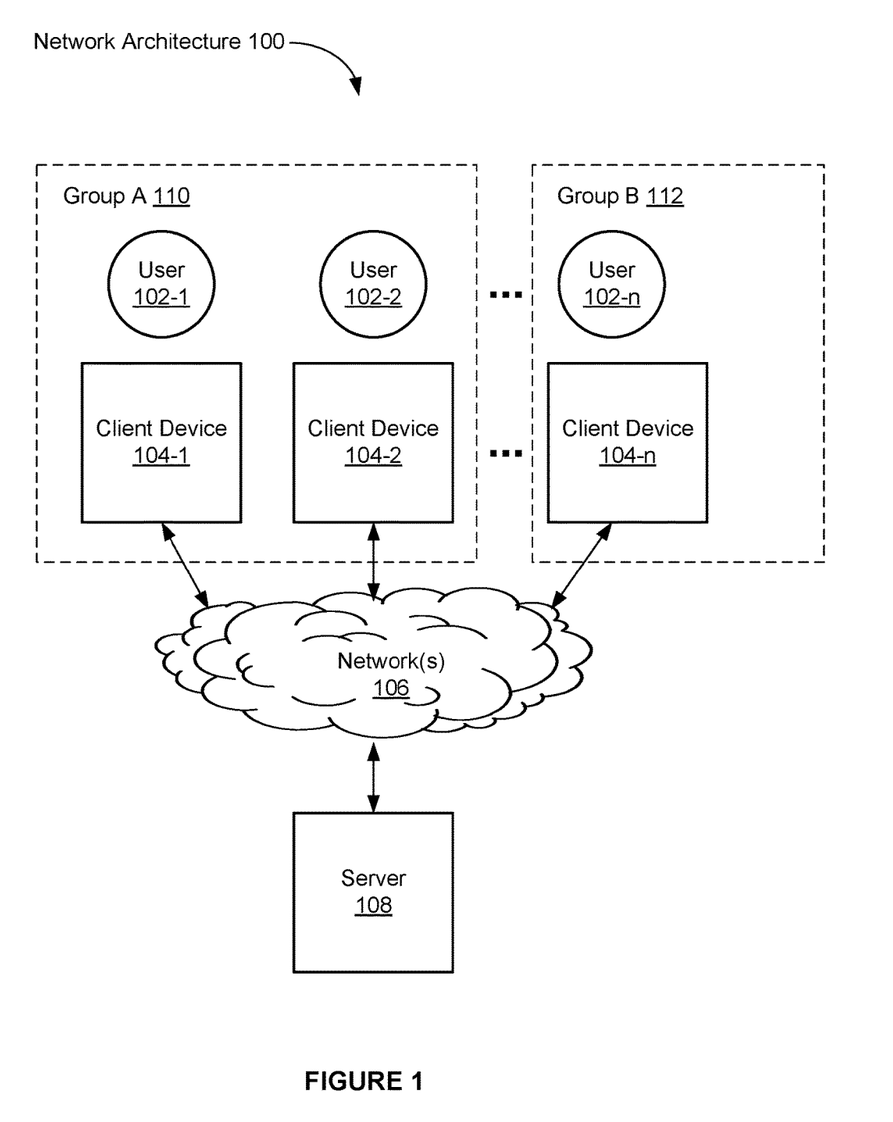
FIG. 1 is a block diagram illustrating a network architecture of a network in accordance with some embodiments.

FIG. 1 is a block diagram illustrating a network architecture 100 of a network in accordance with some embodiments. The network architecture 100 includes a number of client devices (also called "client systems," "client computers," or "clients") 104-1, 104-2, . . . 104-n communicably connected to a server system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic network system and other computing devices (e.g., via the electronic network system). In some embodiments, the server system 108 is a single computing device such as a computer server, while in other embodiments, the server system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to communicate with the server system 108. For example, one or more of the client devices 104-1, 104-2, . . . 104-n execute native applications that communicate with servers. The native applications operate on various operating systems (e.g., iOS, Android, Windows Phone OS, Blackberry OS, etc.).

Users and their client devices may be categorized as being associated with a group. For example, users 102-1, 102-2 employing client devices 104-1, 104-2, respectively, may be associated with Group A 110, as users employing a first type of client device (e.g., with a first operating system) (e.g., iPhones). Similarly, user 102-n employing device 104-n may be associated with Group B 112 as a user employing a second type of client device (e.g., with a second operating system) (e.g., an Android phone). Group A 110 and/or Group B 112 may have one or more users and/or devices associated with the group.

Figure 2:
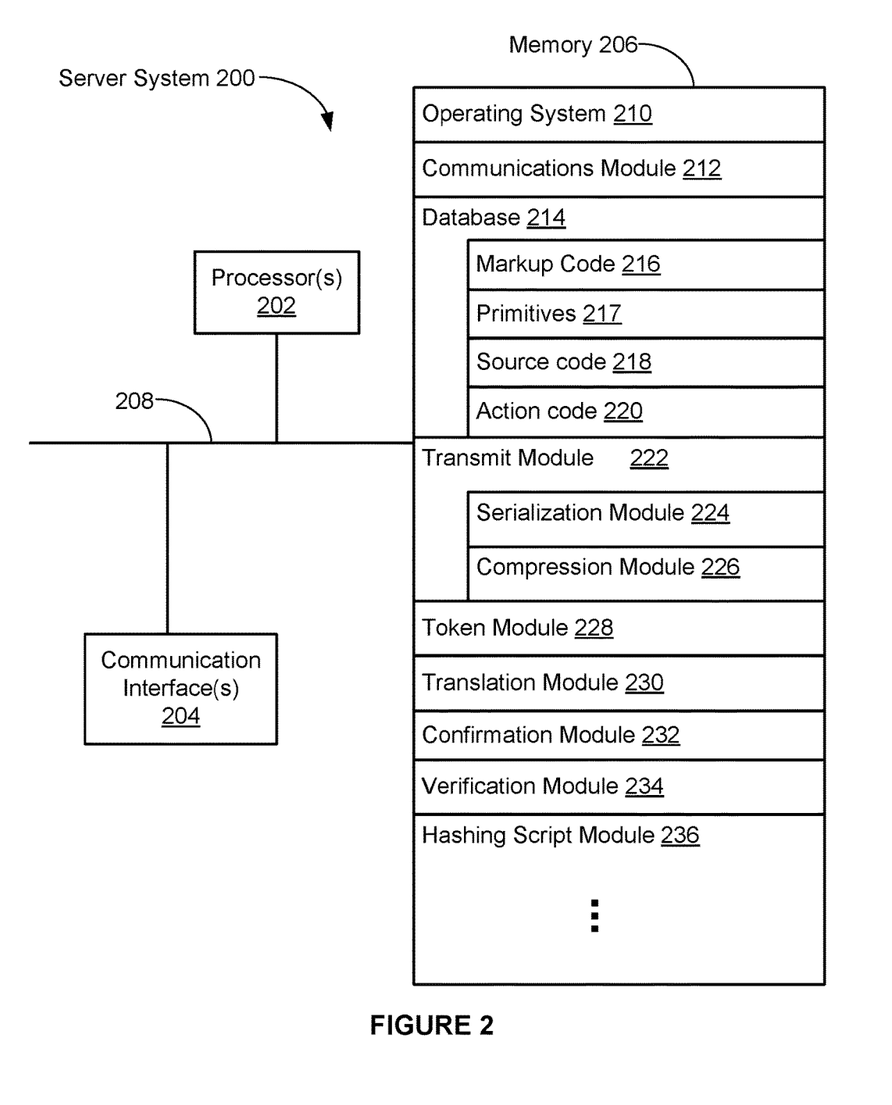
FIG. 2 is a block diagram illustrating a server system in accordance with some embodiments.

FIG. 2 is a block diagram illustrating a server system 200 in accordance with some embodiments. In some embodiments, the server system 200 is an example of server system 108. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
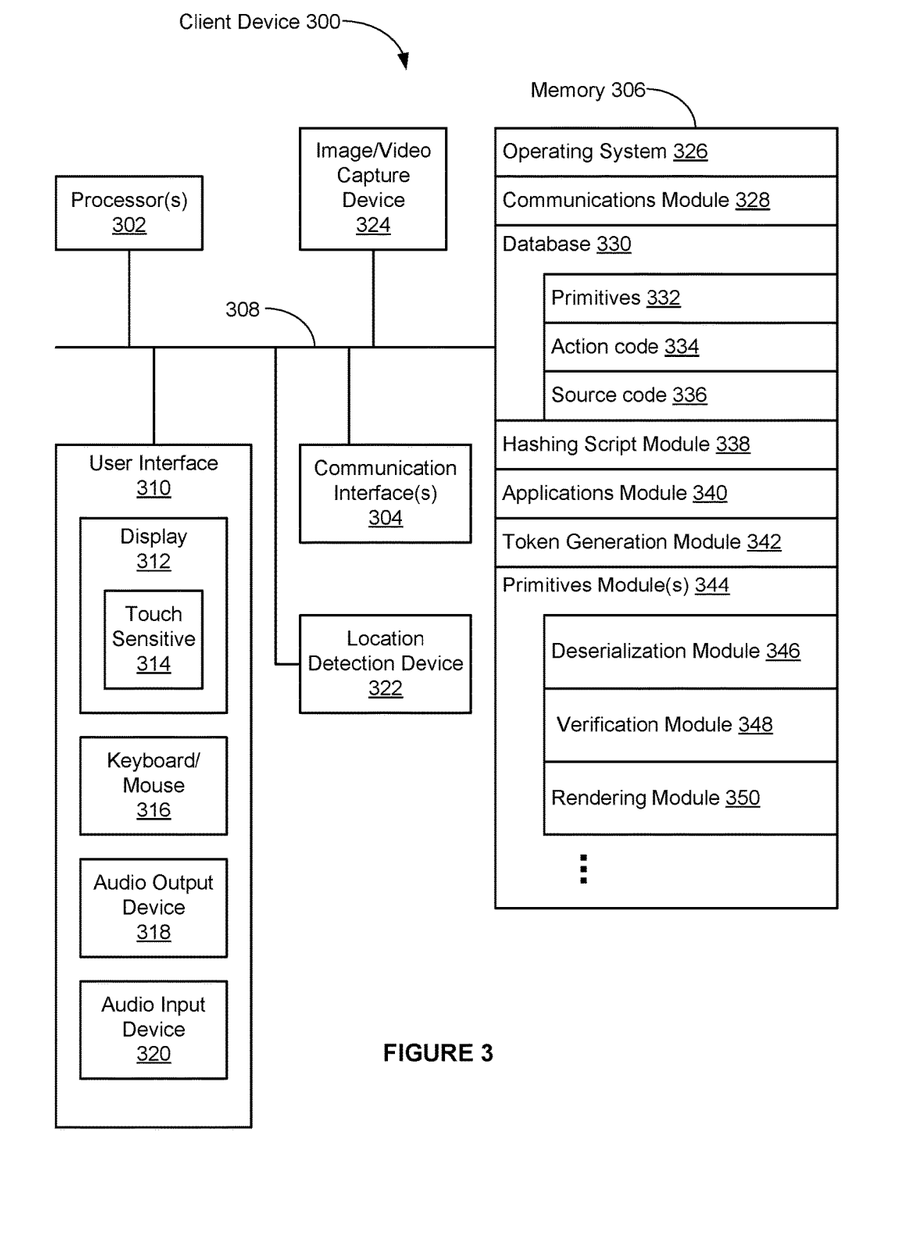
FIG. 3 is a block diagram illustrating a client device in accordance with some embodiments.
Figure 4A:
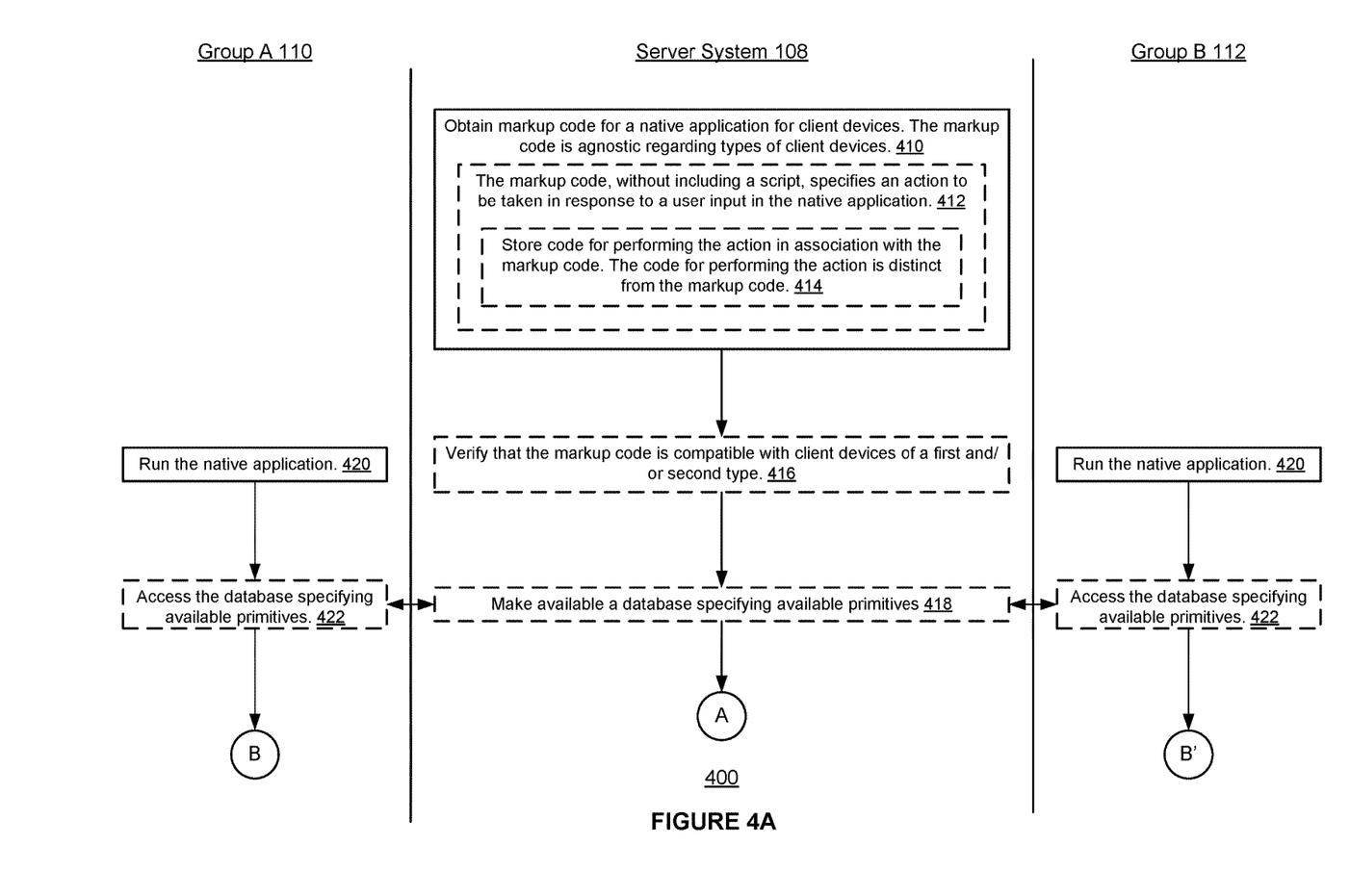
FIGS. 4A-E illustrate a flowchart displaying methods of sending, receiving, and rendering primitives in accordance with some embodiments.
Figure 4B:
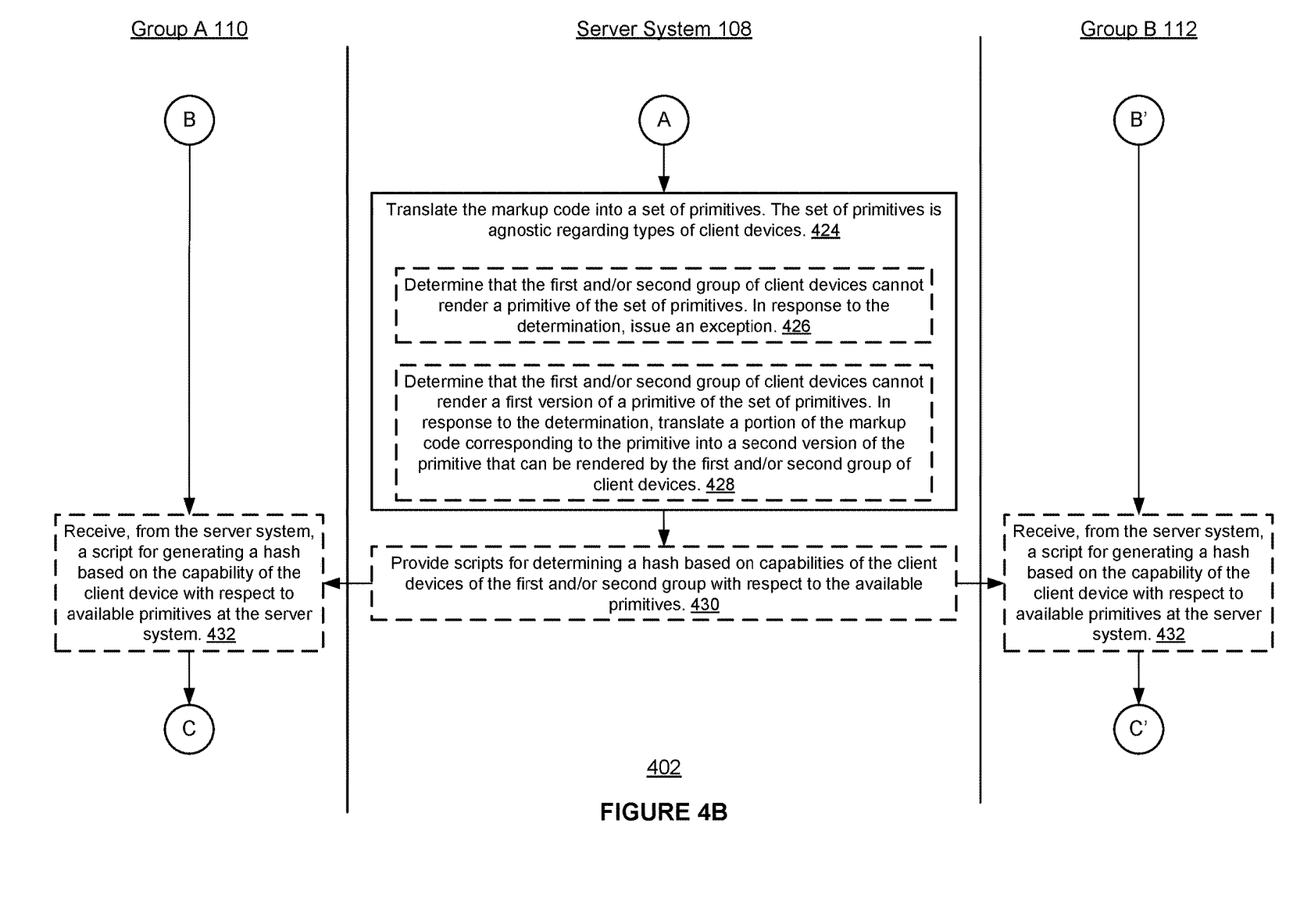
Figure 4C:
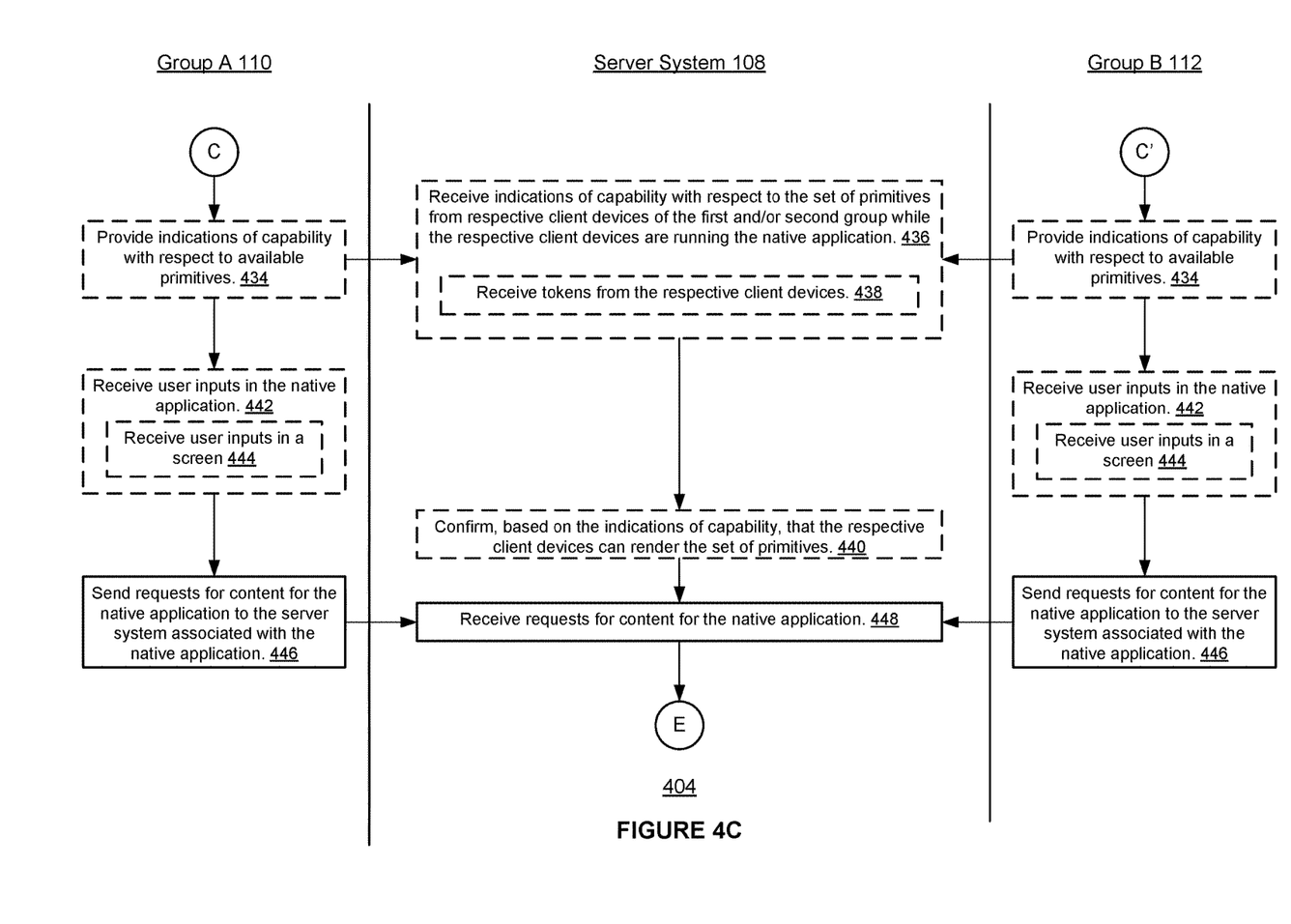
Figure 4D:
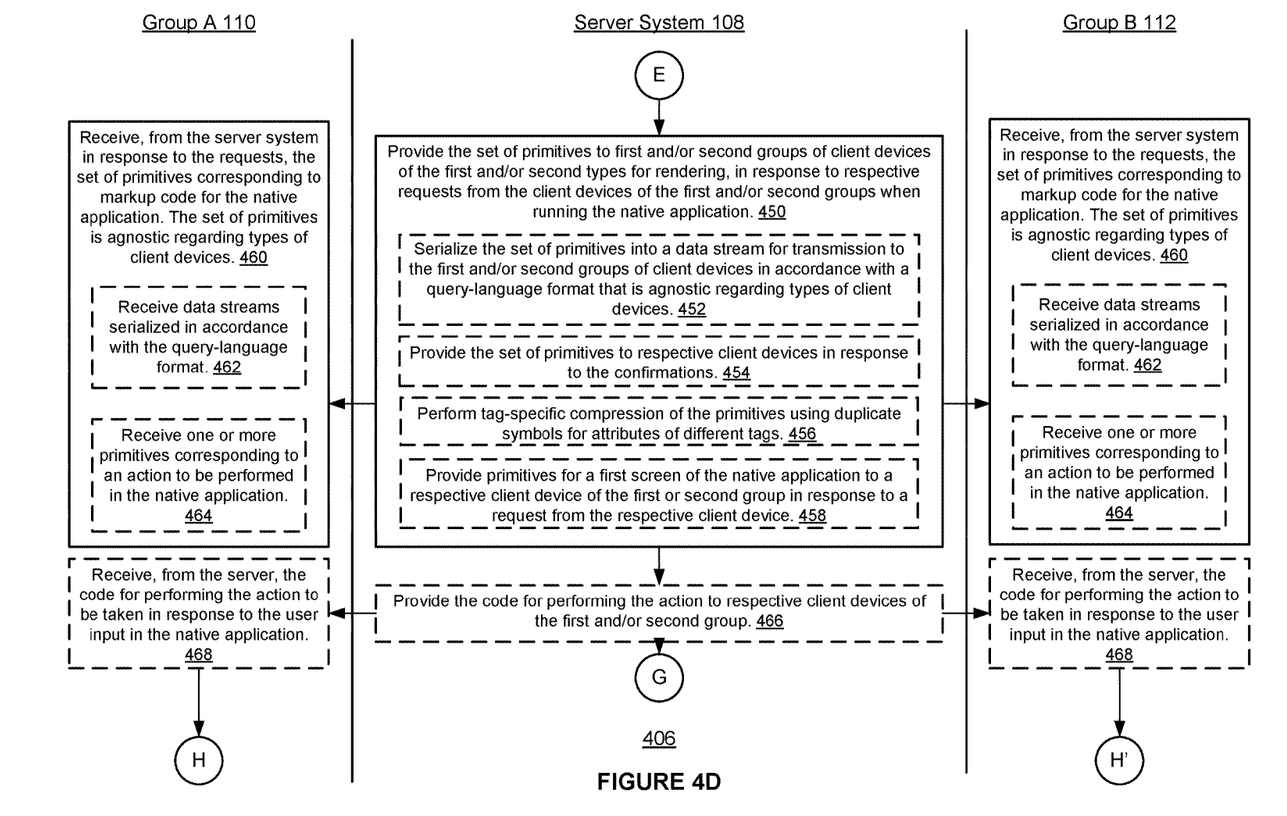
Figure 4E:
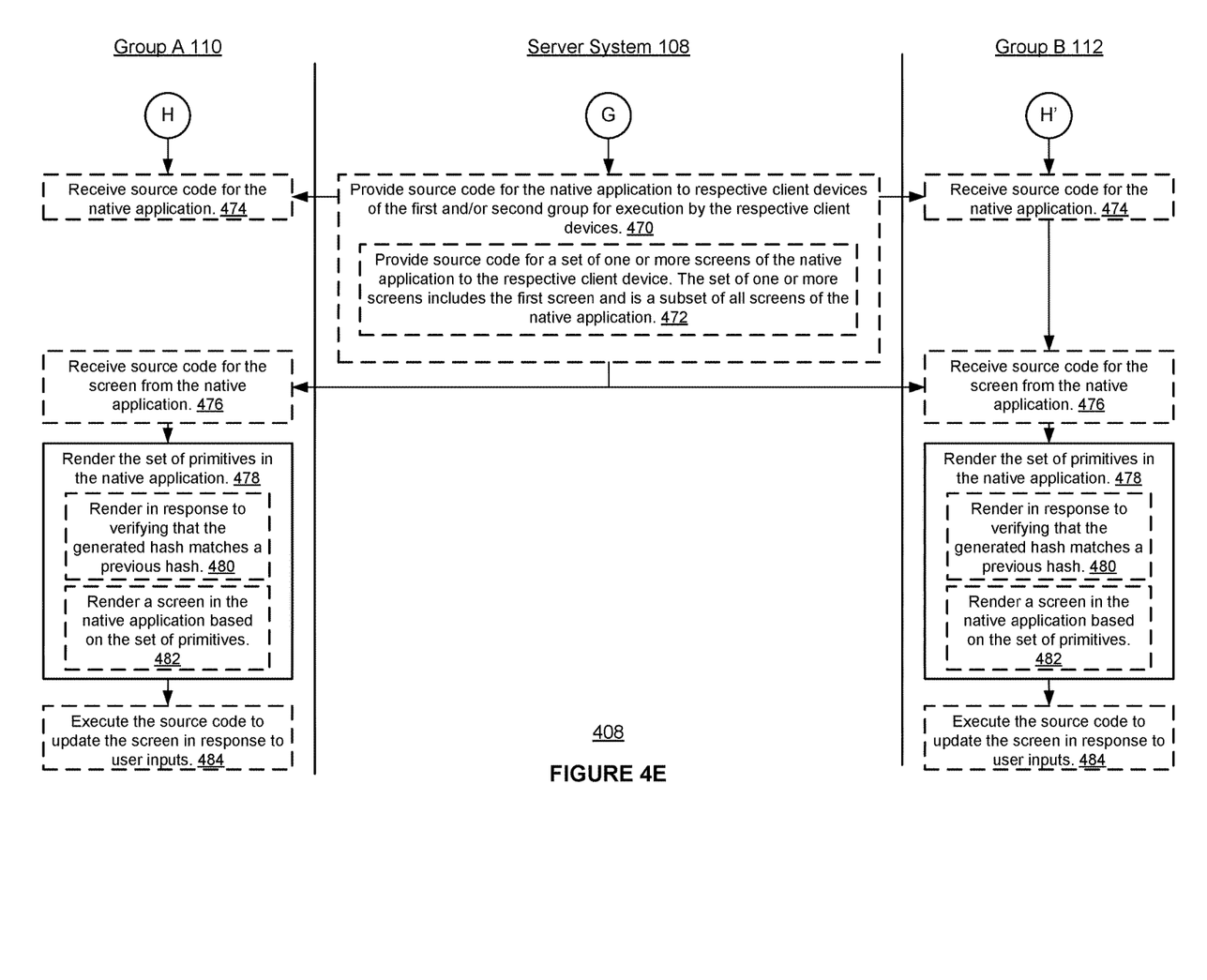

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

- an operating system 210 that includes procedures for handling various basic system services and for performing hardware dependent tasks;
- a network communication module 212 that is used for connecting server system 200 (e.g., server 108, FIG. 1) to other computers (e.g., client devices 104-1, 104-2, . . . 104-n, and/or other servers) via the one or more communication network interfaces 204 (wired or wireless) and one or more communication networks 106, such as the Internet, cellular telephone networks, mobile data networks, other wide area networks, local area networks, metropolitan area networks, and so on;
- a database 214 for storing data associated with the server, such as:
    - markup code 216 (e.g., platform-agnostic) for pages in one or more native applications;
    - primitives 217 (e.g., platform-agnostic) for the source code;
    - source code 218 for native application(s); and
    - action code 220 for specific actions that may be taken in a native application in response to user input;
- a transmit module 222 for providing transmission services and related features (e.g., in conjunction with communication module 328 on the client device 300, FIG. 3), which includes:
    - a serialization module 224 (e.g., for serializing primitives for transmission to client devices); and
    - a compression module 226 for tag compression;
- a token module 228 for forming tokens;
- a translation module 230 for translating markup code into primitives;
- a confirmation module 232 for confirming that particular client devices are capable of receiving primitives;

a verification module 234 to assure that the markup code 216 satisfies expected requirements (e.g., verifying markup-code compatibility with different types of client devices); and a hashing script module 236 for executing a script that generates a hash based on the rendering capabilities of a client device.

FIG. 3 is a block diagram illustrating a client device 300, in accordance with some embodiments. The client device 300 is an example of one of the client devices 104-1, 104-2, ... 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera and/or a webcam.

In some embodiments, the client device 300 includes one or more optional sensors (e.g., gyroscope, accelerometer) for detecting motion and/or a change in orientation of the client device. In some embodiments, the detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

an operating system 326 that includes procedures for handling various basic system services and for performing hardware dependent tasks;

a network communication module 328 that is used for connecting the client device 300 to other computers via the one or more communication network interfaces 304 (wired or wireless) and one or more communication networks, such as the Internet, cellular telephone networks, mobile data networks, other wide area networks, local area networks, metropolitan area networks, and so on;

database 330 including the following information (e.g., received from the server 200, FIG. 2), or a subset or superset thereof:

primitives 332 (e.g., corresponding to primitives 217, FIG. 2);

action code 334 (e.g., corresponding to action code 220, FIG. 2);

source code 336 (e.g., corresponding to source code 218, FIG. 2);

a hashing script module 338 (e.g., with the same script as hashing script module 236, FIG. 2);

an applications module 340 such as applications (e.g., native applications) for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support;

a token generation module 342 for generating tokens;

a primitives module 344 including the following modules or a subset or superset thereof:

deserialization module 346 (e.g., for deserializing primitives received from the server system 200, FIG. 2);

verification module 348 to assure that a native application satisfies expected requirements (e.g., verifying markup-code compatibility) (e.g., to verify that a hash generated by hashing script module 338 matches a previously generated hash); and rendering module 350 to render the primitives 332.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

FIG. 4A-4E are flow diagrams illustrating a method of providing and rendering pages in a native application in accordance with some embodiments. The method is performed by a first group of client devices of a first type (i.e., Group A 110, FIG. 1), a second group of client devices of a second type (i.e., Group B 112, FIG. 1), and the server system 108. The operations performed by the client devices of Group A 110 and Group B 112 correspond to instructions stored in memory 306 (e.g., in a non-transitory computer-readable storage medium) of respective client devices 300 (FIG. 3). The operations performed by the server system 108 correspond to instructions stored in memory 206 (FIG. 2) (e.g., in a non-transitory computer-readable storage medium).

Figure 5A:
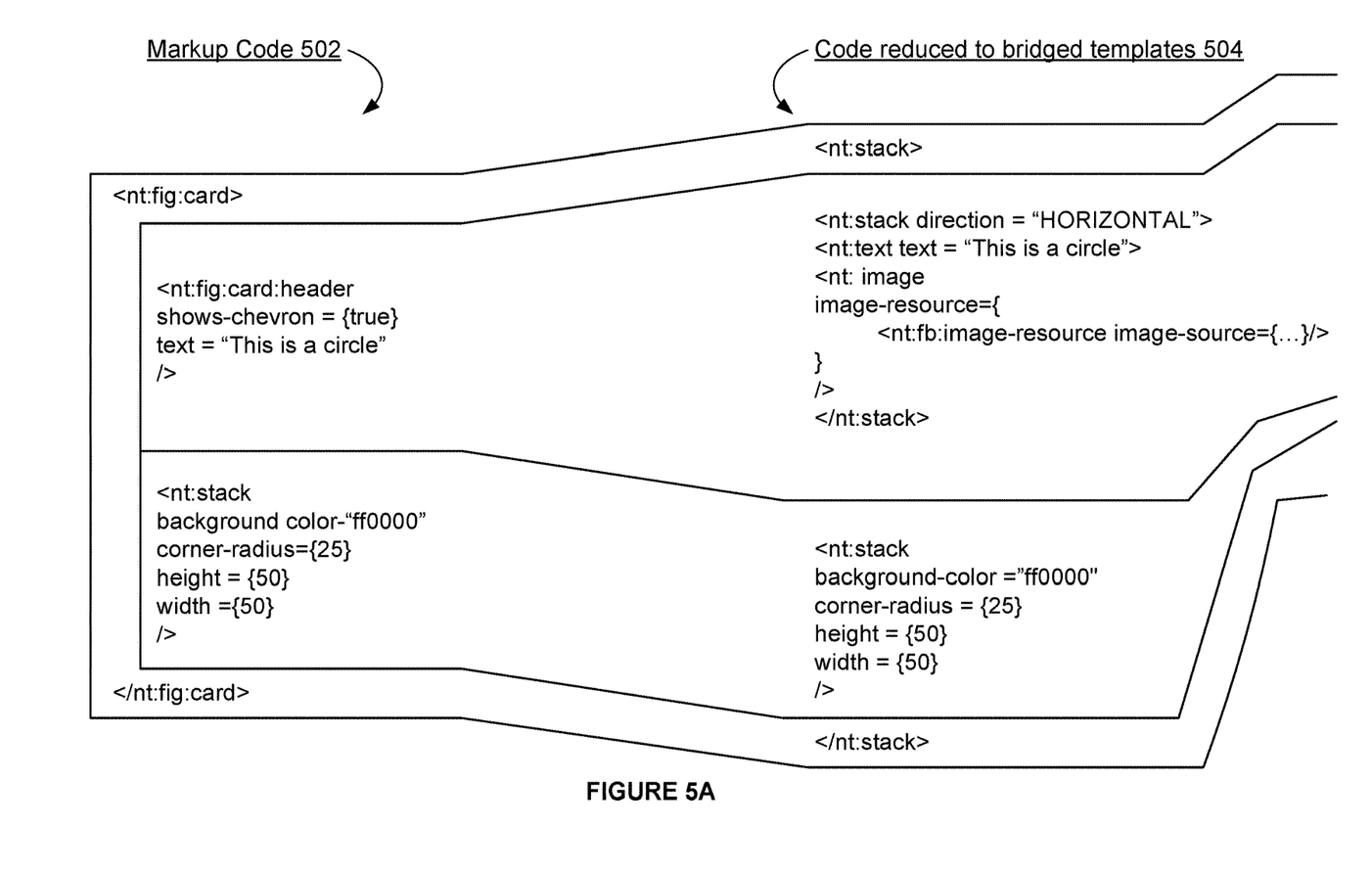
FIGS. 5A-5B illustrate code in accordance with some embodiments.
Figure 5B:
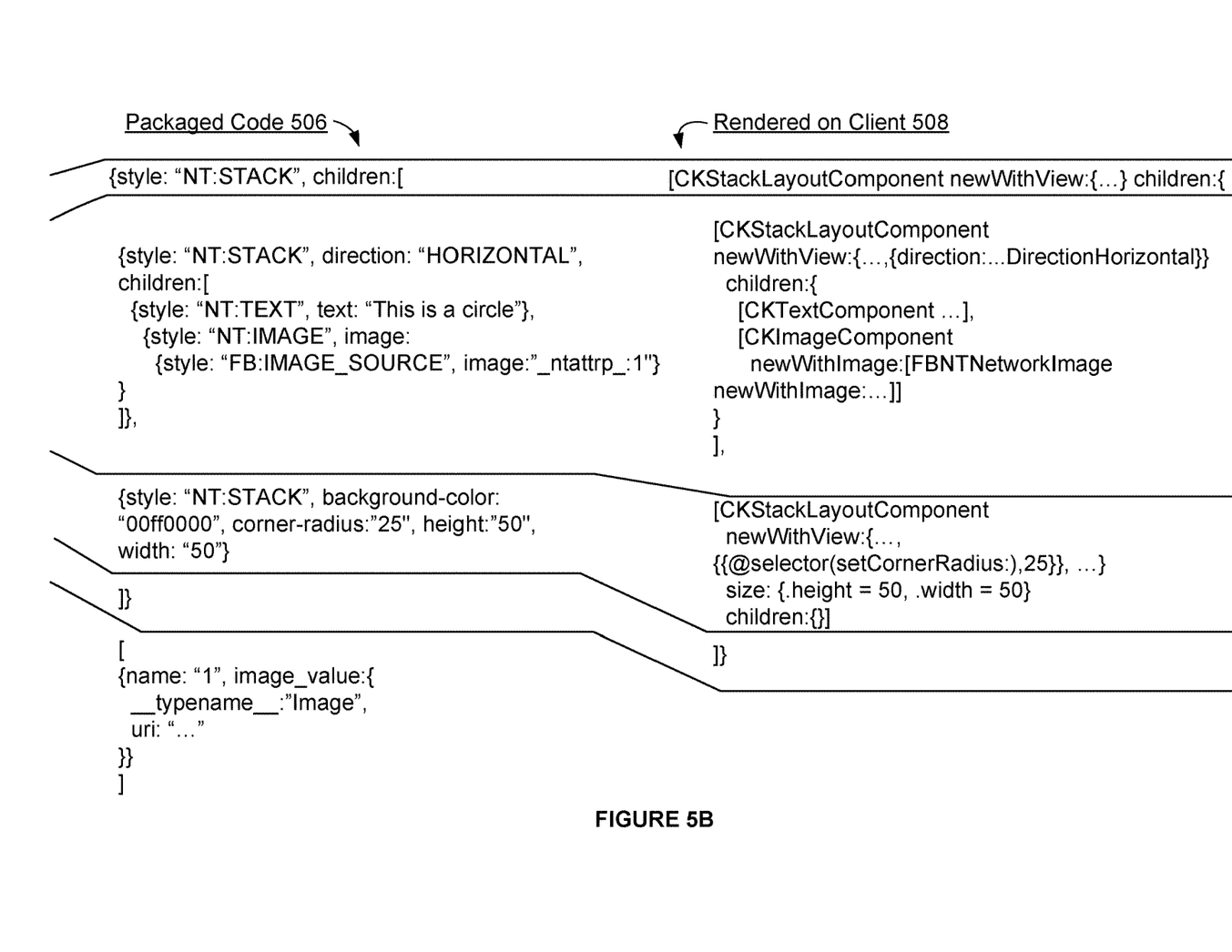
Figure 6:
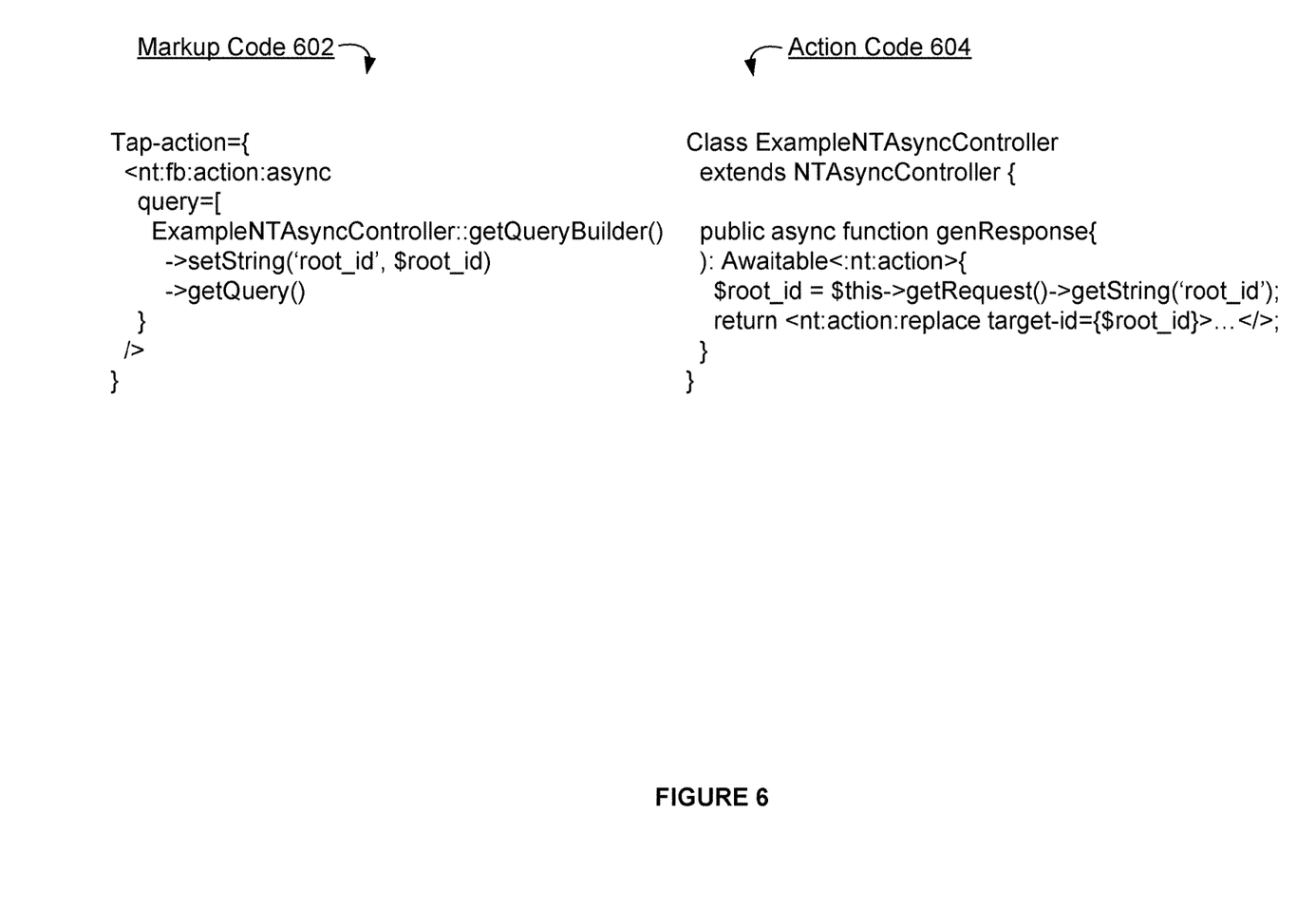
FIG. 6 illustrates code in accordance with some embodiments.

The method of FIGS. 4A-4E is described with reference to FIGS. 5A-5B and 6. FIG. 5A shows code stored at the server 108 including markup code 502 (e.g., markup code 216 FIG. 2) and code reduced to bridged templates 504 (e.g., primitives 217, FIG. 2) in accordance with some embodiments. FIG. 5B illustrates packaged code 506 for transmitting to client devices and code 508 rendered on client devices in accordance with some embodiments. The code 508 is client-side code (e.g., C, Java, HTML, etc.) that may be platform-specific (e.g., may be specific to the type of client device, such as the operating system of the client device). FIG. 6 illustrates markup code 602 and associated code 604 (e.g., action cod 220, FIG. 2) for an action specified in the markup code 602, in accordance with some embodiments.

The client devices of Group A 110 and Group B 112 run 420 a native application. For example, the client devices of Group A 110 run a first version of the native application on a first operating system, and the client devices of Group B 112 run a second version of the native application on a second operating system. In some embodiments, the native application is distinct from a web browser; alternatively, the native application may be a web browser. The method of FIGS. 4A-4E thus may be performed for native applications that are distinct from web browsers, or alternatively for web browsers.

The server system 108 obtains 410 markup code (e.g., markup code 502, FIG. 5; markup code 216, FIG. 2) for the native application for client devices. The markup code may have been previously stored (e.g., at the server system 108) or may be dynamically generated by the server system 108. The markup code is agnostic regarding types of client devices. For example, the same markup code may be used for different versions of the native application as implemented on different client-device operating systems.

In some embodiments, the markup code is pseudo-code (e.g., pseudo-HTML without valid HTML tags). For example, a tag within the markup code may not be a valid HTML tag, but instead may be a tag used in a primitive into which a portion of the markup code will be converted.

In some embodiments, the markup code, without including a script, specifies 412 an action to be taken in response to a user input in the native application. For example, markup code 602 (FIG. 6) specifies an action. In some embodiments, the server system 108 stores 414 code for performing the action (e.g., action code 604, FIG. 6; action code 220 FIG. 2) in association with the markup code. The code for performing the action is distinct from the markup code.

In some embodiments, the server system 108 verifies 416 that the markup code is compatible (e.g., using verification module 348, FIG. 3, which may include one or more static analysis tools) with client devices of the first and/or second type (i.e., the type corresponding to Group A 110 and/or Group B 112).

In some embodiments, the server system 108 makes available 418 a database specifying available primitives (e.g., database 214, primitives 217, FIG. 2). In some embodiments, the client devices of Group A 110 and/or Group B 112 access 422 the database specifying the available primitives to determine whether the primitives are compatible with the client devices. For example, the database may be considered a code base and the client devices walk the code base. In some embodiments, the specification of the available primitives is provided in accordance with the type of client device requesting access. Specifications for the available primitives, as provided by the server system 108, thus may be specific to particular types of client devices (e.g., to particular operating systems). Requests from client devices for accessing the database may be accompanied with (e.g., may include) an indication of device type. For example, a first set of specifications may be provided to Group A 110 and a second, distinct set of specifications may be provided to Group B 112.

The server system 108 translates 424 (FIG. 4B) (e.g., using translation module 230, FIG. 2) the markup code into a set of primitives. For example, markup code 502 is translated into code reduced to bridged templates 504 (FIG. 5). The code reduced to bridged templates 504 is an example of primitives. The set of primitives is agnostic regarding types of client devices. For example, the same markup code may be used for different versions of the native application as implemented on different client-device operating systems.

In some embodiments, the server system 108 determines 426 that the first and/or second group of client devices (i.e., Group A 110 and/or Group B 112) cannot render a primitive of the set of primitives. In response to the determination, the server system issues an exception, thus providing a warning to the developer.

In some embodiments, the server system 108 determines 428 that the first and/or second group of client devices (i.e., Group A 110 and/or Group B 112) cannot render a first version of a primitive of the set of primitives. In response to the determination, the server system 108 translates a portion of the markup code corresponding to the primitive into a second version of the primitive that can be rendered by the first and/or second group of client devices.

In some embodiments, the server system 108 provides 430, to client devices of Group A 110 and/or Group B 112, scripts for determining a hash (e.g., hashing script module 236, FIG. 2) based on capabilities of the client devices of the first and/or second group with respect to the available primitives. The hash can be used to determine whether primitives for the native application are compatible with a respective client device (e.g., in operation 480, FIG. 4E). Client devices of Group A 110 and/or Group B 112 thus receive 432, from the server system 108, a script for generating a hash (e.g., hashing script module 338, FIG. 3) based on the capability of the client device with respect to available primitives at the server system.

In some embodiments, client devices of Group A 110 and/or Group B 112 provide 434 (FIG. 4C) indications of capability with respect to available primitives. The server system 108 thus receives 436 indications of capability with respect to the set of primitives from respective client devices of the first and/or second group while the respective client devices are running the native application. In some embodiments, the server system 108 receives 438 tokens (e.g., from token generation module 342, FIG. 3) from the client devices. In some embodiments, the tokens received from the client devices include information specifying supported markup code. The server system 108 confirms 440 (e.g., using confirmation module 232, FIG. 2), based on the indications of capability, that the respective client devices can render the set of primitives. In some embodiments, the server system 108 does not provide primitives to a client device in operation 450 (see below) without having confirmed that the client device can render the primitives.

In some embodiments, the client devices of Group A 110 and/or Group B 112 receive 442 user inputs in the native application. For example, the client devices of Group A 110 and/or Group B 112 receive 444 user inputs in one or more screens (e.g., one or more pages) of the native application.

The client devices of Group A 110 and/or Group B 112 send 446 requests for content for the native application to the server system 108, which is associated with the native application. The requests are sent, for example, in response to the user inputs. The server system 108 thus receives 448 one or more requests for content for the native application.

The server system 108 provides 450 (FIG. 4D) the set of primitives to the first and/or second groups of client devices (i.e., to Group A 110 and/or Group B 112) of the first and/or second types for rendering, in response to respective requests from the client devices of the first and/or second groups when running the native application.

In some embodiments, the server system serializes 452 (e.g., using serialization module 224, FIG. 2) the set of primitives into a data stream for transmission to the first and/or second groups of client devices in accordance with a query-language format that is agnostic regarding types of client devices. For example, the code reduced to bridged templates 504 (FIG. 5A) is packaged as packaged code 506 (FIG. 5B) and serialized. In some embodiments, the server system 108 provides 454 the set of primitives to respective client devices in response to the confirmation of operation 440.

In some embodiments, providing the set of primitives includes formatting the set of primitives (e.g., as part of the serialization) in accordance with the type of client device to which the set of primitives is being sent. Thus, while the primitives are platform-agnostic, they may be provided in platform-specific formats. For example, a first format may be used for Group A 110 and a second, distinct format may be used for Group B 112.

In some embodiments, the server system 108 performs 456 tag-specific compression (e.g., using compression module 226, FIG. 2) of the primitives using duplicate symbols for attributes of different tags. Respective tags in the markup code and associated primitives may have one or more attributes. Using duplicate symbols for attributes of different tags increases compression efficiency. In some embodiments, the compression is performed in accordance with the type of client device requesting access. Different compression schemes may be used for different types of devices. For example, a first compression scheme may be used for Group A 110 and a second, distinct compression scheme may be used for Group B 112.

In some embodiments, the server system 108 provides 458 primitives for a first screen (e.g., a first page) of the native application to a respective client device of the first or second group in response to a request from the respective client device. The requests and corresponding transmission of primitives thus may be specific to respective screens of the native application.

The client devices of Group A 110 and/or Group B 112 receive 460, from the server system 108 in response to the requests, the set of primitives (e.g., primitives 332, FIG. 3) corresponding to markup code for the native application. The set of primitives is agnostic regarding types of client devices. In some embodiments, the client devices of Group A 110 and/or Group B 112 receive 462 data streams serialized in accordance with the query-language format. For example, the client devices receive packaged code 506 (FIG. 5B). In some embodiments, the client devices of Group A 110 and/or Group B 112 deserialize (e.g., using deserialization module 346, FIG. 3) the respective data streams received from the server system 108.

In some embodiments, the client devices of Group A 110 and/or Group B 112 receive 464 one or more primitives corresponding to respective actions to be performed in the native application.

In some embodiments, the server system 108 provides 466 the code for performing the action (i.e., the code stored in operation 414) (e.g., (e.g., action code 604, FIG. 6; action code 220 FIG. 2) to respective client devices of the first and/or second group. Client devices of Group A 110 and/or Group B 112 thus receive 468, from the server system 108, the code for performing the action (e.g., action code 334, FIG. 3) to be taken in response to the user input in the native application. For a given action, a corresponding primitive may reference corresponding action code, which the client device executes to perform the action.

In some embodiments, the server system 108 provides 470 (FIG. 4E) source code (e.g., source code 218, FIG. 2) for the native application to respective client devices of the first and/or second group for execution by the respective client devices. The source code may be executed in response to user inputs received in a screen that the client device initially renders using primitives received from the server system 108. In some embodiments, the server system 108 provides 472 source code for a set of one or more screens (e.g., one or more pages) of the native application to the respective client device, which receives 474 the source code. The set of one or more screens may include the first screen (e.g., is just the first screen, or is a group of screens including the first screen) for which primitives have been provided and is a subset of all screens of the native application. The client devices of Group A 110 and/or Group B 112 receive 476 source code for the screen from the native application.

The client devices of Group A 110 and/or Group B 112 render 478 (e.g., using rendering modules 350, FIG. 3) the set of primitives in the native application. In some embodiments, the rendering includes converting the set of primitives into client-side, platform specific code (e.g., code 508, FIG. 5B) (e.g., code specific to either Group A 110 or Group B 112) that can be rendered by the native application. In some embodiments, the rendering is performed 480 in response to verifying that the hash generated at the client device matches a previous hash, and thus to verifying that rendering capabilities of the client device have not changed. The previous hash may have also been generated at the client device or may have been generated at the server system 108 and transmitted to the client device. In some embodiments, the client devices of Group A 110 and/or Group B 112 render 482 a screen in the native application based on the set of primitives.

In some embodiments, the client device of Group A 110 and/or Group B 112 executes 484 the source code to update the screen in response to user inputs. Thus, after initial rendering using the primitives, subsequent operation of the native application may occur independently of the server system 108, unless or until a fault condition occurs that prompts the client device to request additional information from the server system 108.

Although FIGS. 4A-4E illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a server system having one or more processors and memory storing instructions for execution by the one or more processors:
   obtaining markup code of a native application for client devices, wherein the markup code is agnostic regarding types of client devices;
   translating the markup code into a set of primitives, distinct from the markup code, wherein the set of primitives includes a plurality of primitives and is agnostic regarding types of client devices;
   providing information corresponding to the set of primitives to a plurality of client devices, the plurality of client devices including a first group of client devices of a first type and a second group of client devices of a second type, the information including scripts for determining capabilities of respective client devices of the plurality of client devices with respect to the set of primitives;
   receiving from each client device in the first group of client devices and the second group of client devices, an indication of capability to render the set of primitives;
   providing the set of primitives to the first group of client devices for rendering, in response to respective requests from the client devices of the first group when running the native application; and
   providing the set of primitives to the second group of client devices for rendering, in response to respective requests from the client devices of the second group when running the native application.

2. The method of claim 1, wherein:
   the first group of client devices of the first type has a first operating system and a first renderer for rendering the set of primitives; and
   the second group of client devices of the second type has a second operating system and a second renderer for rendering the set of primitives.

3. The method of claim 1, wherein providing the set of primitives to the first and second groups of client devices comprises serializing the set of primitives into a data stream for transmission to the first and second groups of client devices in accordance with a query-language format that is agnostic regarding types of client devices.

4. The method of claim 1, wherein the indication of capability is received while the each client device is running the native application.

5. The method of claim 4, wherein receiving the indication of capability from the each client device comprises receiving a token from the each client device.

6. The method of claim 4, further comprising, at the server system:
   making available to a plurality of client devices a database specifying available primitives;
   wherein the scripts are for determining a hash based on capabilities of respective client devices of the plurality of client devices with respect to the available primitives.

7. The method of claim 1, further comprising, at the server system:
   while translating the markup code into the set of primitives, determining that the first group of client devices cannot render a first primitive of the set of primitives; and
   in response to determining that the first group of client devices cannot render the first primitive, issuing an exception.

8. The method of claim 1, wherein the translating comprises:
   determining that the first group of client devices cannot render a first version of a first primitive of the set of primitives; and
   in response to the determining, translating a portion of the markup code corresponding to the first primitive into a second version of the first primitive that can be rendered by the first group of client devices.

9. The method of claim 1, further comprising, at the server system:
   before translating the markup code into the set of primitives, verifying that the markup code is compatible with client devices of the first and second types.

10. The method of claim 1, wherein the markup code, without including a script, specifies an action to be taken in response to a user input in the native application.

11. The method of claim 10, further comprising, at the server system,
    storing code for performing the action in association with the markup code, wherein the code for performing the action is distinct from the markup code; and
    providing the code for performing the action to respective client devices of the first and second groups.

12. The method of claim 1, wherein providing the primitives to the first and second groups of client devices comprises performing tag-specific compression of the primitives using duplicate symbols for attributes of different tags.

13. The method of claim 1, further comprising, at the server system, providing source code for the native application to respective client devices of the first group for execution by the respective client devices.

14. The method of claim 1, wherein:
    providing the set of primitives to the first group of client devices of the first type comprises providing primitives for a first screen of the native application to a respective client device of the first group in response to a request from the respective client device; and
    the method further comprises, at the server system, in response to the request from the respective client device, providing source code for a set of one or more screens of the native application to the respective client device, wherein the set of one or more screens includes the first screen and is a subset of all screens of the native application.

15. A method, comprising:
    at a client device having one or more processors and memory storing instructions for execution by the one or more processors:

receiving from a server system associated with a native application information corresponding to a set of primitives, wherein the set of primitives is translated from markup code of the native application;

determining capability of the client device with respect to the set of primitives based on the information, the information including scripts for determining the capability;

running the native application;

sending a request for content for the native application to the server system associated with the native application;

sending, to the server system, an indication of the client device's capability to render the set of primitives;

receiving, from the server system in response to the request, the set of primitives corresponding to the markup code for the native application; and rendering the set of primitives in the native application, wherein the set of primitives includes a plurality of primitives;

the set of primitives and the markup code are agnostic regarding types of client devices; and the set of primitives is distinct from the markup code.

16. The method of claim 15, wherein rendering the set of primitives comprises converting the set of primitives into client-side code that is specific to a device type of the client device.

17. The method of claim 15, further comprising, at the client device:

providing to the server system, in conjunction with the request, an indication of capability with respect to available primitives;

wherein the set of primitives as received from the server system is verified to be compatible with the client device.

18. The method of claim 15, wherein the information corresponding to the set of primitives includes the scripts for generating a hash based on the capability of the client device with respect to the set of primitives at the server system; and the method further comprising, at the client device, generating the hash while running the native application and verifying that the generated hash matches a previous hash, wherein the rendering is performed in response to the verifying.

19. The method of claim 15, further comprising, at the client device:

receiving a user input in the native application; and providing an indication of the user input to the server system;

wherein receiving the set of primitives corresponding to markup code for the native application comprises receiving one or more primitives corresponding to an action to be performed in the native application.

20. The method of claim 15, wherein rendering the set of primitives in the native application comprises rendering a screen in the native application based on the set of primitives, the method further comprising, at the client device:

receiving source code for the screen from the native application;

receiving a user input in the screen; and in response to the user input, executing the source code to update the screen.

* * * * *